May 17, 1960
H. H. RAYMOND
2,936,954
ELECTRICAL CONTROL DEVICE FOR COUNTERS
Filed Sept. 16, 1953
2 Sheets-Sheet 1
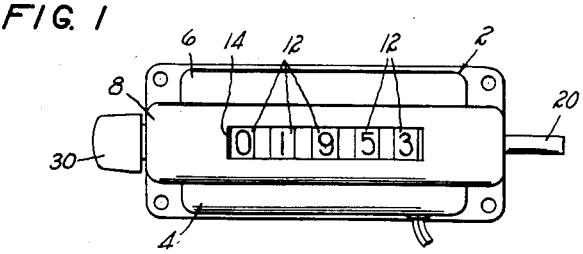
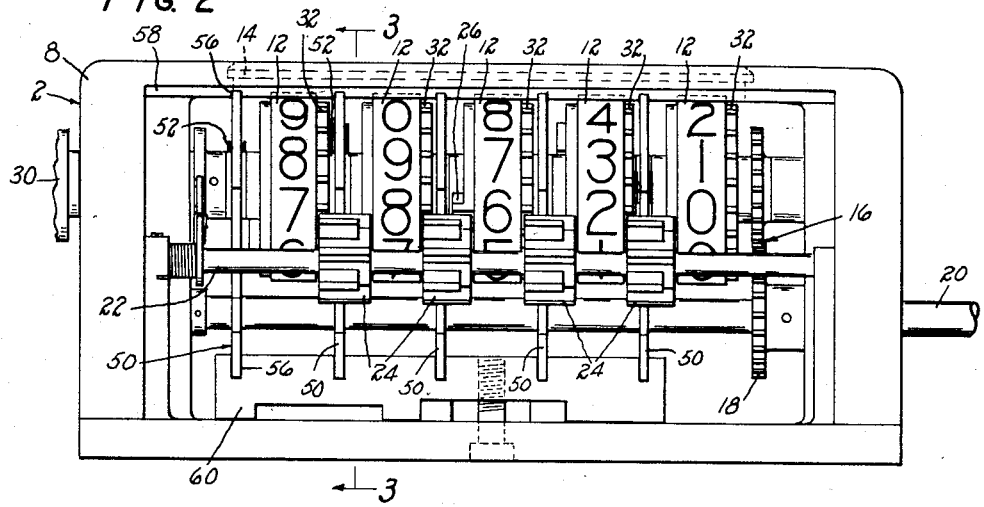
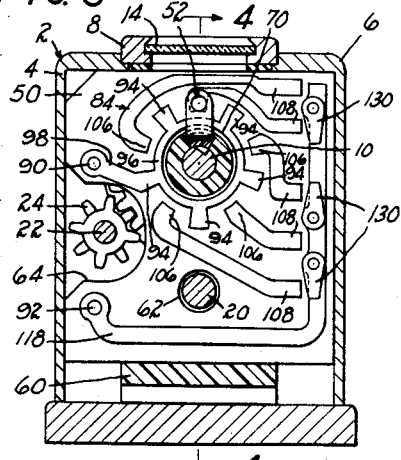
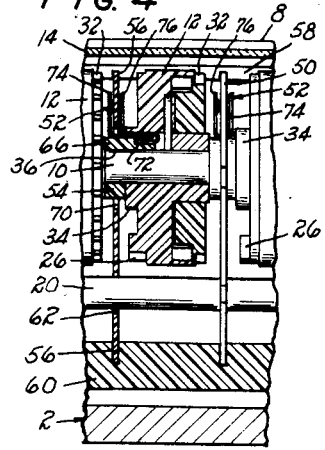
INVENTOR.
HORACE H. RAYMOND
BY
Lindsey and Prutzman
ATTORNEYS May 17, 1960 H. H. RAYMOND 2,936,954
ELECTRICAL CONTROL DEVICE FOR COUNTERS
Filed Sept. 16, 1953 2 Sheets-Sheet 2
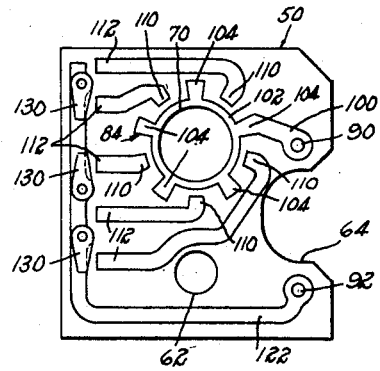
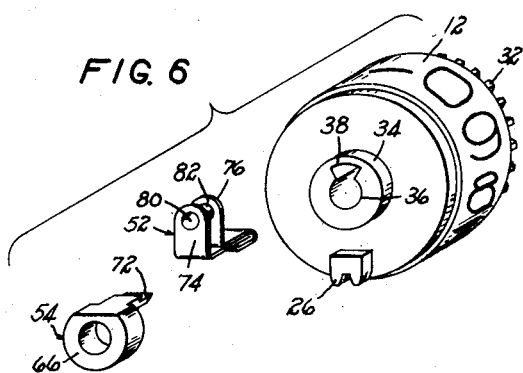
INVENTOR.
HORACE H. RAYMOND
BY
Lindsey and Prutzman
ATTORNEYS United States Patent Office 2,936,954
Patented May 17, 1960

2,936,954

ELECTRICAL CONTROL DEVICE FOR COUNTERS

Horace H. Raymond, Berlin, Conn., assignor to Veeder-Root Incorporated, Hartford, Conn., a corporation of Connecticut Application September 16, 1953, Serial No. 380,503

7 Claims. (Cl. 235—132)

The present invention relates to an electrical control device for use with mechanical counters, and more particularly to such a device of the predeterminator type for signalling the registry of a predetermined numerical count on counters of the type having a plurality of number wheels supported in closely adjacent relation on a common axis.

The term predeterminator is used herein to mean a control device for actuating associated apparatus in response to the arrival of the tally count registered by the counter at a preset or predetermined number. Such a control mechanism might be used, for example, with dispensing apparatus wherein it is desired to dispense a predetermined quantity which may be represented by a numerical count on the counter. In that way, when the numerical indication on the counter representing the total quantity dispensed coincides with the predetermined number at which it is desired that dispensing cease, the control mechanism would be operated and the associated dispensing apparatus would be shut off.

An object of the present invention, therefore, is to provide an electrical control device for signalling the registry of a predetermined count on the number wheels of a mechanical counter.

Another object is to provide such a control device which is particularly suited for use with a multiple number wheel counter wherein the number wheels are arranged in closely adjacent coaxial relation, as when supported on a common shaft.

Another object is to provide an electrical control device of the character described whose principal moving parts are operated directly by the mechanical counter number wheels themselves.

Another object is to provide a control device of the character described for use with a multiple number wheel mechanical counter wherein the number wheels are arranged in adjacent coaxial relation, which device occupies very little space, and can be arranged in intimate relation with the conventional parts of the mechanical counter with a minimum increase in the spacing of the number wheels.

Another object is to provide an electrical control device for signalling the registry of a predetermined count on the number wheels of a mechanical counter, wherein the count whose registry is to be signalled may be simply adjusted, positively and accurately, to any desired number.

Another object is to provide an electrical control device of the character described which is simple and durable in structure, inexpensive to manufacture, and capable of accurate and reliable operation for long periods without cleaning or adjustment.

Another object is to provide an electrical predeterminator of the character described in which all of the structural components are arranged for disposition between the closely adjacent number wheels of the counter.

Another object is to provide an electrical predeterminator in which the only parts which move during operation of the counter are carried directly by the number wheels of the counter, thereby insuring positioning of these moving parts with the same degree of positiveness and accuracy as the number wheels themselves are positioned during operation of the counter.

Another object is to provide an electrical predeterminator for use with multiple number wheel mechanical counters for performing an electrical switching operation in response to the advance of the number wheels of the counter to a predetermined tally.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a top view to a reduced scale of a multiple number wheel mechanical counter of the type with which the electrical control device of the present invention is particularly suitable;

Figure 2 is a front view of the counter shown in Figure 1 with parts removed to show the arrangement of the internal parts of the counter, and the associated parts of the electrical control device;

Figure 3 is a sectional view of the counter shown in Figure 2, taken on the line 3—3 thereof, and showing a view from one side of a portion of an electrical predeterminator constructed in accordance with the present invention;

Figure 4 is a fragmentary view of a portion of the counter shown in Figure 2, partly sectionalized in the plane of line 4—4 of Figure 3 to show the internal construction of a number wheel of the counter, and the associated components of a portion of an electrical predeterminator constructed in accordance with the present invention;

Figure 5 is a view of the side of one of the elements of the electrical predeterminator, opposite to the side shown in Figure 3; and Figure 6 is an exploded view of a single number wheel for use in the counter, and the elements of the predeterminator which are carried by such a number wheel and rotate therewith.

Referring to the drawings, wherein like reference characters indicate like parts in the several views, an electrical predeterminator constructed in accordance with the present invention is shown in association with a multiple number wheel mechanical counter. The counter is substantially conventional in structure arrangement and operation, differing from what is old in the art only insofar as is required to accommodate the structure components of the electrical predeterminator, as will hereinafter be described.

Such a counter, as shown in outline in Figure 1 and in section in Figure 2, includes a casing 2 including a front cover 4 and a back cover 6, and a central frame 8 in which is journaled a longitudinal shaft 10 on which are supported in coaxial adjacent relation a plurality of number wheels 12.

In operation of the counter the number wheels 12 display numerals through a viewing window 14 in the top of the casing 2, which numerals represent successive digits of a numerical total or tally count which the counter is employed to record. The number wheels 12 are driven through a gear train 16, one gear 18 of which is supported on a driving shaft 20 which extends externally of the counter frame 8 and is adapted to be connected to any desired mechanism, whose operation the counter thereby tallies.

A jack shaft 22 is also supported in the frame 8 and carries spaced transfer pinions 24 which are suitably actuated by a two-toothed driving gear segment 26 carried by each respective number wheel 12. The function of the transfer pinions 24, as is well understood by those familiar with the art, is to advance a particular number wheel by one number when the number wheel for the next lower order digit has completed one full rotation through its ten number range. The longitudinal shaft 10 carrying the several number wheels 12 is provided with a handle 30 at one end, and also has a longitudinal keyway therein, which coacts with pawls inside the number wheels 12 in the conventional manner to effect resetting of the counter to zero.

The number wheels 12 are identical, and each is marked on its periphery with evenly spaced consecutive numerical indicia, from zero to nine. On the side of each number wheel 12 opposite the two-toothed driving gear segment 26 is a driven gear 32 which meshes with the transfer pinion 24 actuated by the driving gear 26 of the number wheel of next lower order to effect the transfer operation. On its other side, each number wheel 12 also is provided with an outwardly projecting hub 34, coaxial with the throughbore 36 in the number wheel which receives the longitudinal shaft 10. Each hub 34 is provided with an internal slot 38, as shown particularly in Figure 6, for a purpose hereinafter described.

Turning now particularly to Figures 3 and 4 of the drawings, in an electrical predeterminator constructed in accordance with the present invention, there is provided in association with each number wheel of the counter a stator plate 50, a switch arm 52 and a switch arm retainer 54.

The stator plates 50 are disposed in sandwiched or interstratified relation with the number wheels 12, and are supported in this position in parallel transverse slots 56 provided in top and bottom spacer elements 58, 60 fastened to the counter frame 8. The stator plate 50 for each number wheel 12 is thus positioned parallel to, and closely adjacent one side of, the number wheel.

The several stator plates 50 are identical, and are preferably electrically non-conducting, and of minimum thickness consistent with mechanical rigidity. Each plate is provided with a circular aperture 62 for accommodating the driving shaft 20 of the counter, and each is also cut away on its front side, as at 64, to accommodate the jack shaft 22 and adjacent transfer pinion 24 carried thereby.

Supported in the slot 38 in the hub 34 of each number wheel 12 is the switch arm retainer 54, the outer end of which is provided with a collar 66 for encircling longitudinal shaft 10. The switch arm retainer 54 extends outwardly from the side of number wheel 12 preferably beyond the adjacent stator plate 50, and each stator plate 50 is provided with an additional circular aperture 70 of sufficient diameter to accommodate the switch arm retainer 54 with a small annular clearance.

The switch arm retainer is provided at its inner end with a notch or step 72, and is preferably of such a size with relation to slot 38 in hub 34 of number wheel 12 as to accommodate the wsitch arm 52 therebetween with a tight sliding fit. The arrangement is preferably such that the number wheel 12, switch arm 52, and switch arm retainer 54 fit tightly together, and the switch arm 52 is thereby securely supported from the number wheel 12 for rotation therewith. Preferably, the switch arm retainer 54 is electrically non-conducting and thus insulates switch arm 52 form the longitudinal shaft 10. Also each number wheel 12 is preferably electrically non-conducting, or so constructed as to electrically insulate the switch arm 52 from the shaft 10.

The switch arm 52 is bifurcated to provide two fingers 74 and 76, one finger 74 of which extends through the annular clearance between stator plate 50 and switch arm retainer 54 and engages the side of the stator plate remote from the number wheel 12 in resilient wiping contact. The other finger 76 of switch arm 52 engages the side of the stator plate adjacent the number wheel 12 in wiping contact. The fingers 74, 76 are preferably provided with opposed detents 80, 82 near their outer ends to reduce the area of contact with stator plate 50 to substantially a pair of opposed points. The switch arm 52 is electrically conducting so as to provide an electrical connection between the contact points of the fingers 74, 76 on the opposite sides of stator plate 50. Switch arm 52 may conveniently be formed from a single piece of resilient conducting material, folded at its center for retention in the notch or step 72 of the switch arm retainer 54, as shown in Figure 4, and having its ends bent so as to resiliently engage the opposite sides of the stator plate 50 in wiping contact.

It may thus be seen that as the number wheel 12 rotates, the points of contact of fingers 74, 76 of switch arm 52 with the sides of stator plate 50 define circular loci on opposite sides of the stator plate, concentric with the axis of longitudinal shaft 10.

On each stator plate 50 is geometrically arranged a plurality of electrical contacts 84, one pair of contacts being provided on each stator plate 50 for each number on its adjacent number wheel 12. The contacts 84 of each pair are disposed in exactly opposite relation on different sides of the stator plate 50, the contacts 84 of pairs corresponding to consecutive numbers on the number wheel being thus arranged consecutively on the stator plate 50 along the loci of contact of the switch arm fingers 74, 76. In operation of the counter, rotation of a number wheel 12 carries the fingers 74, 76 of its switch arm 52 around their circular paths of contact on both sides of the adjacent stator plate 50, and, as each number in turn is displayed by the number wheel, the pair of contacts 84 corresponding to that number is short circuited through the switch arm 52.

Each stator plate 50 is also provided with a pair of spaced electrical terminals 90, 92, positioned respectively above and below the transfer pinion cutout 64. The arrangement of the electrical circuitry associated with these terminals 90, 92 on the several stator plates 50 is identical, and will therefore be described in connection with only a single stator plate, and with particular reference to Figures 3 and 5 of the drawings.

The upper terminal 90 is connected on the side of the stator plate adjacent its number wheel 12 only to those contacts 94 of each pair corresponding to alternate numbers, say odd numbers, on the number wheel. This connection, as shown in Figure 3, is provided by a conductor 96 which joins these alternate contacts 94 together, and an additional conductor 98 connecting conductor 96 to terminal 90. Such conductors may be printed, plated or otherwise secured to stator plate 50. Terminal 90 extends through to the opposite side of the stator plate 50, i.e. remote from its number wheel 12, and on that side, as shown in Figure 5, is connected by conductors 100 and 102 to the contacts 104 of pairs to which it is not connected on the previous side, i.e. those corresponding to even numbers on the number wheel 12. Upper terminal 90 is thus permanently electrically connected to one contact of each pair of the stator plate, though these connections are divided between both sides of the stator plate 50.

The lower terminal 92 is arranged to be connected selectively to the one of the other contacts, i.e. those corresponding to even numbers on the stator plate side adjacent number wheel 12 and those corresponding to odd numbers on the stator plate side remote from number wheel 12, which belongs to the pair corresponding to a selected number on the number wheel 12. In this way, when number wheel 12 displays the selected number, the two contacts of the corresponding pair are shorted through switch arm 52, and hence the terminals 90 and 92 are electrically connected, the net effect being equivalent to the automatic closing of a switch.

To provide for such a selected connection of lower terminal 92 to a selected one of the contacts not connected to upper terminal 90, as shown in Figure 3, those contacts 106 are connected on one side of the stator plate to respective conductor 108 which terminates near the back of the stator plate. On the other side of the stator plate, such contacts 110 are connected, as shown in Figure 5, to respective conductors 112 which terminate near the back of the stator plate. Positioned adjacent the ends of these conductors 108, 112, but electrically insulated therefrom, is a conductor 118 on the one side of the stator plate, and a conductor 122 on the other side of the stator plate. Conductors 118 and 122 connect to opposite ends of terminal 92, which extends through stator plate 50 and electrically joins them thereby.

Electrically connected to conductors 118 and 122, and spaced along them adjacent the ends of respective conductors 108, 112, are pivotable switch tabs 130, which are of sufficient length to bridge the gap between a conductor and the adjacent one of conductors 108 and 112. These switch tabs 130 thereby provide a means of selectively connecting to the lower terminal 92 that one of the contacts not connected to the upper terminal 90 in the pair corresponding to a selected number wheel number. Thus it may be seen that when one contact 106 or 108 of a pair corresponding to a selected number wheel number has been connected to the lower terminal 92 by positioning of the proper switch tab 130 to bridge the gap between a conductor 118 or 122 and the conductor 108 or 112 leading to the contact, subsequent rotation of the number wheel 12 to a position displaying the selected number positions the opposed fingers 74, 76 of the bifurcated switch arm 52 on the contacts of the selected pair, and electrically connects the upper and lower terminals 90 and 92.

The several switch tabs 130 are adapted to be manually positioned, and hence afford a positive and accurate control of the number selected for any particular number wheel, as well as a simple means of easily and rapidly changing the number selected.

To signal the registry of all of the number wheels 12 of a multiple number wheel counter at their respective selected numbers, the terminals 90, 92 of the several stator plates 50 are electrically connected in series by wires, not shown, or equivalent conductors joining one terminal of each stator plate to the same terminal on one of its neighbors, and joining the other terminal of the stator plate to the like terminal on the other of its neighbors, in the manner of the connection of several batteries in series. The unjoined terminals of the end stator plates may then be connected into any desired signalling or actuating circuit to ring a bell or perform any desired operation when the selected numerical tally is arrived at on the counter.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In an electrical control device for signalling the registry of a predetermined number on a number wheel of a mechanical counter, a stator plate supported at one side of the number wheel, an electrically conducting switch arm supported on the number wheel for rotation therewith, a pair of switch contacts on said stator plate for each number on the number wheel, said pairs of contacts being disposed with the contacts of each pair of opposite sides of said stator plate and respectively coincident with the position of said switch arm during the display of a respective number on the number wheel, said switch arm bifurcatingly engaging both sides of said stator plate in wiping contact for electrically connecting the contacts of a pair when positioned coincident therewith, spaced terminals on said stator plate, means permanently connecting one contact of each of said pairs to one of said terminals, and means selectively connecting the other contact of a pair corresponding to a selected number on the number wheel to the other of said terminals, whereby rotation of the number wheel to display said selected number electrically connects said spaced terminals.

2. An electrical switch for signalling the arrival of a number wheel of a mechanical counter at a predetermined rotated position corresponding to its display of a selected number comprising a stator plate supported in parallel adjacent relation at one side of said number wheel, an electrically conducting switch arm supported on said number wheel for rotation therewith and having fingers continuously engaging both sides of said stator plate in wiping contact during rotation of said number wheel, each side of said stator plate having a plurality of respective contacts corresponding to the respective numbers on said number wheel, said contacts being spaced along the loci of engagement of said switch arm fingers with said stator plate at positions coincident with the position of said switch arm fingers during the display of particular respective numbers on said number wheel, a first terminal and a second terminal on the stator plate, a first electrical conductor connecting to said first terminal the contacts on one side of said stator plate corresponding to odd numbers and the contacts on the other side of said stator plate corresponding to even numbers, a second electrical conductor connected to said second terminal, and means on said stator plate for selectively connecting to said second electrical conductor the other contact of the pair corresponding to said selected number on said number wheel, whereby the display of said selected number on said number wheel electrically connects said first and second terminals through said switch arm.

3. In an electrical control device for signalling the registry of a predetermined numerical tally on a multiple number wheel mechanical counter wherein the number wheels are disposed in closely adjacent relation on a common axis, a stator plate supported at one side of each number wheel, a pair of spaced electrical contacts on the stator plate for each number on the number wheel, a switch arm for shorting the contacts of a pair when positioned coincident therewith, said switch arm being supported on the number wheel for rotation therewith as the number wheel rotates during a counting operation, said pairs of contacts having respective angular dispositions about said common axis coincident with the position of said switch arm during the display of particular respective numbers on the number wheel, electrical conducting means permanently connecting one contact of each pair to a first terminal, additional electrical conducting means connected to a second terminal, and a switch tab for selectively connecting to said additional conducting means the other contact of the pair corresponding to a selected number wheel number.

4. An electrical predeterminator for a multiple number wheel mechanical counter having its number wheels disposed in adjacent relation on a common axis comprising a stator plate supported in said counter at one side of each number wheel, a pair of spaced contacts on the stator plate for each number on the number wheel, said pairs of contacts being disposed at equal angles about the common axis, a switch arm supported on each number wheel for rotation therewith into electrical conducting relation between the spaced contacts of each of said successive pairs during rotation of the number wheel, a first electrical conductor on said stator plate permanently connecting one contact of each pair to a first terminal, a second electrical conductor on said stator plate connected to a second terminal, and means on said stator plate for connecting to said second electrical conductor the other contact of a pair corresponding to a selected number on the adjacent number wheel, whereby rotation of the adjacent number wheel to said selected number electrically connects said first and second terminals.

5. In an electrical predeterminator for a counter having a plurality of number wheels disposed in adjacent relation on a common axis, a non-conducting stator plate for each number wheel, means supporting said stator plates in interstratified relation with said number wheels, each stator plate having a pair of spaced electrical contacts thereon corresponding to each number wheel number, an electrically conducting switch arm supported on each number wheel for rotation therewith into electrical conducting relation between the spaced contacts of each successive pair of contacts on the adjacent number stator plate during successive counts of the number wheel, each of said stator plates having a first terminal thereon and a first electrical conductor thereon permanently connecting one contact of each pair of contacts to said first terminal, each stator plate having a second terminal thereon and a second electrical conductor thereon connected to said second terminal, means on each stator plate for selectively connecting said second electrical conductor to the other contact of a pair corresponding to a selected number on the adjacent number wheel, whereby rotation of each number wheel to its respective selected number electrically connects the first and second terminal of its adjacent stator plate, and means connecting the terminals of adjacent stator plates electrically in series, whereby the electrical connection of the first and second terminals of each of said stator plates responsive to the positioning of its adjacent number wheel at its respective selected number completes a series circuit through all of said stator plates.

6. An electrical predeterminator for a multiple number wheel mechanical counter having number wheels disposed in adjacent relation on a common axis comprising a non-conducting stator plate for each number wheel, means supporting said stator plates in said counter in interstratified relation with said number wheels, a pair of spaced electrical contacts on each stator plate for each number on the number wheel, said pairs of contacts on each stator plate being spaced at equal angles about the common axis with the contacts of each pair disposed on opposite sides of said stator plate, a switch arm supported on each number wheel and bifurcatingly engaging both sides of its adjacent stator plate in wiping contact for electrically connecting the contacts of each of said successive pairs during rotation of the number wheel, a first electrical terminal and a second electrical terminal on each stator plate, a first electrical conductor on each stator plate forming a permanent electrical connection between said first terminal and the one contact of each successive pair positioned alternately on one side and on the other side of said stator plate, a second electrical conductor on each stator plate connected to said second terminal, and switch tab means on each stator plate for selectively connecting to said second electrical conductor the other contact of a pair corresponding to a selected number on the adjacent wheel, whereby rotation of each number wheel to its respective selected number electrically connects the first and second electrical terminals on its adjacent stator plate, and means connecting alternately the adjacent first terminals and adjacent second terminals of successive stator plates, whereby a series circuit is completed between all of said terminals when each number wheel is rotated to its respective selected number.

7. In an electrical control device for signalling the registry of a predetermined numerical tally on a multiple number wheel mechanical counter wherein the number wheels are supported in closely adjacent relation on a common shaft journaled in a frame, a stator plate for each number wheel having a circular aperture therein for receiving said common shaft, means supporting said stator plate in said frame in interstratified relation with the said number wheels and with said apertures coaxial with said shaft, an electrically conducting switch arm supported on each number wheel for rotation therewith about said common shaft, a pair of spaced switch contacts on each stator plate for each number on its corresponding number wheel, said contacts being disposed circumferentially about the periphery of said aperture on opposite sides of the stator plates and spaced thereon in coincidence with the successive positions of the switch arm on the corresponding number wheel during the display of successive respective numbers on said number wheel, each of said switch arms having a first finger and a second finger, means supporting each of said switch arms for extension of said first finger through the aperture of its adjacent stator plate into wiping engagement with the contacts on the remote side of said stator plate and wiping engagement of said finger with the contacts on the adjacent side of said stator plate for electrically connecting the contacts of each successive pair on the adjacent stator plate when coincident therewith on each successive count of the number wheel, first and second terminals on each of said stator plates, first electrical conductor means on each stator plate connecting to said first terminal contacts of alternate pairs on one side of said stator plate and contacts of pairs other than said alternate pairs on the other side of said stator plate, second electrical conductor means on each stator plate connected to said second terminal, and switch tab means on each stator plate for selectively connecting to said second electrical conductor means the other contact of a pair corresponding to a selected number on the corresponding number wheel, whereby rotation of each of said number wheels to its respective selected number electrically connects the first and second terminals on each respective adjacent stator plate, and means connecting the terminals of several stator plates in series, whereby a series electrical circuit is completed between said several stator plates responsive to the registry of a predetermined count on the counter.

References Cited in the file of this patent
UNITED STATES PATENTS

| | | |
|---|---|---|
| 2,133,262 | Wolff | Oct. 11, 1938 |
| 2,295,968 | Poole | Sept. 15, 1942 |
| 2,344,254 | Leathers et al. | Mar. 14, 1944 |
| 2,539,138 | Johnson | Jan. 23, 1951 |
| 2,616,994 | Luhn | Nov. 4, 1952 |
| 2,633,506 | Wittenmyer | Mar. 31, 1953 |
| 2,700,076 | Goode | Jan. 18, 1955 |